United States Patent Office 3,447,879
Patented June 3, 1969

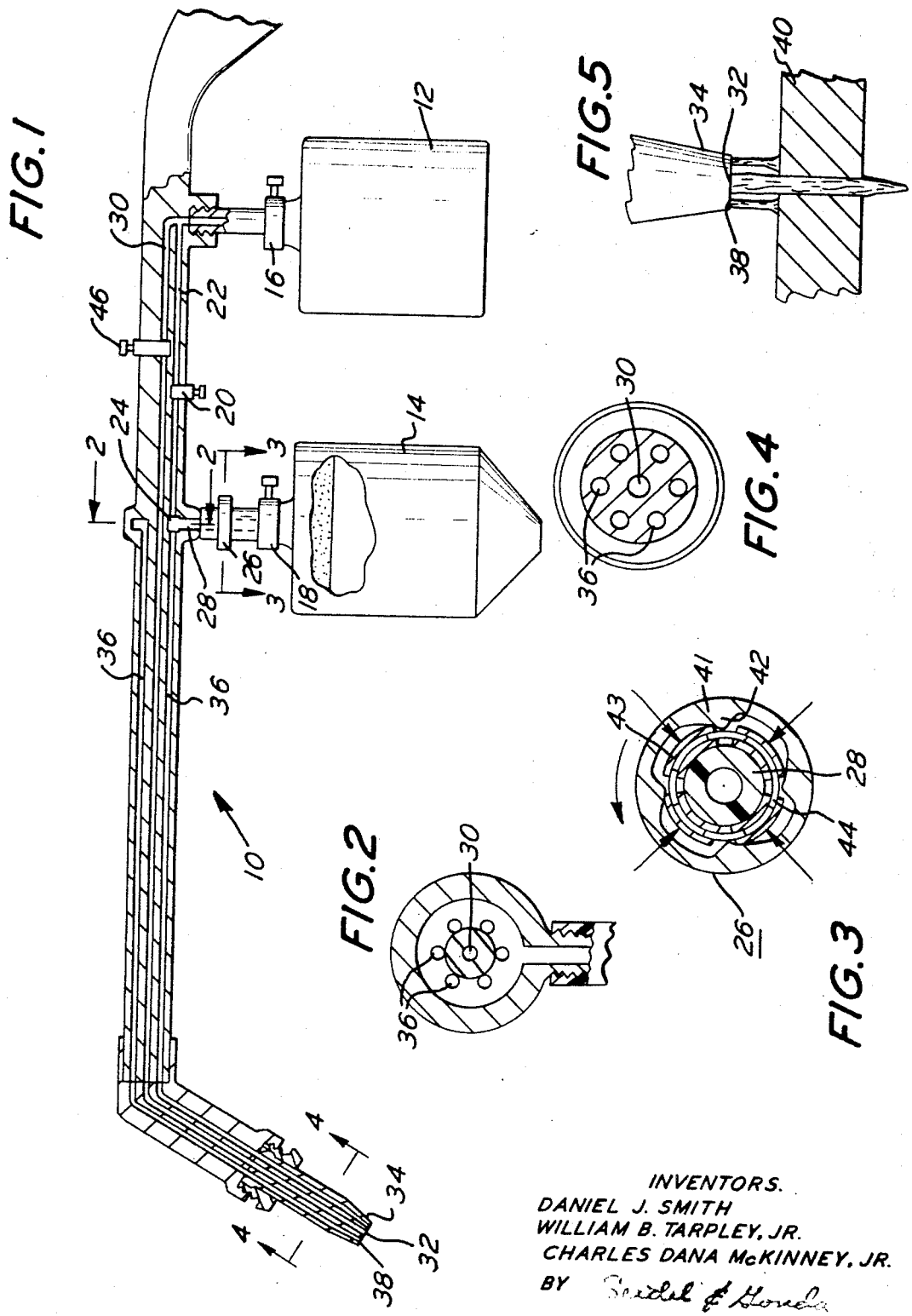

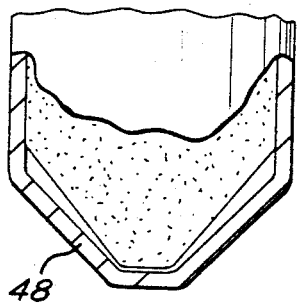
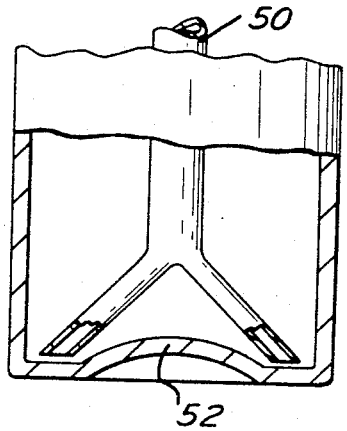
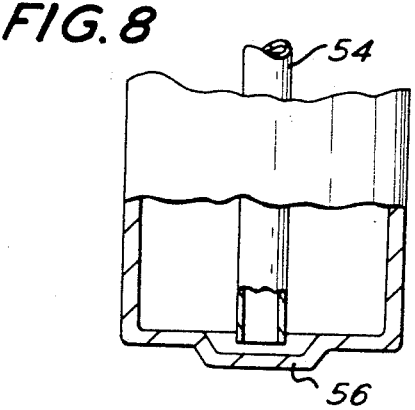
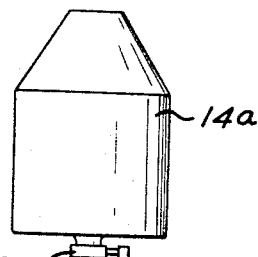
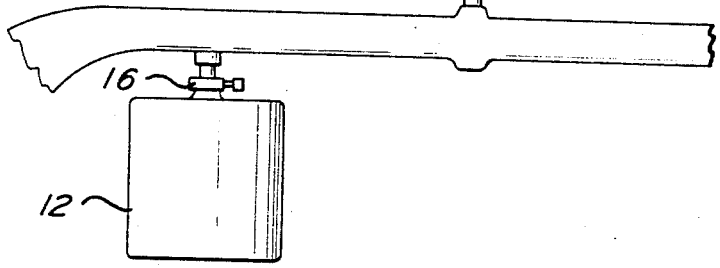

3,447,879
CUTTING TORCH AND METHOD FOR ACHIEVING HIGH TEMPERATURE CUTTING
Daniel J. Smith, Elkton, Md., William B. Tarpley, Jr., West Chester, Pa., and Charles Dana McKinney, Jr., Wilmington, Del., assignors to Aeroprojects Incorporated, West Chester, Pa., a corporation of Pennsylvania
Filed Nov. 6, 1967, Ser. No. 680,656
Int. Cl. F23j 7/00; F23d 17/00; F23c 1/02
U.S. Cl. 431—4                                     15 Claims

ABSTRACT OF THE DISCLOSURE

A cutting torch which includes a cylinder of gelled carrier liquefied combustible gas containing uniformly disposed therewithin finely divided solid fuel, and a process for high temperature cutting comprising gasifying the aforesaid gelled carrier liquefied combustible gas and solid fuel mixture to form a stream, igniting the stream, and applying the ignited stream to the work being cut.

---

This invention is directed to a cutting torch and to a method for achieving high temperature cutting.

A number of techniques have been developed to achieve the high temperature cutting of materials.

Oxyacetylene flame cutting has been used for the cutting of steel. With this technique the metal to be cut is preheated to its oxygen-ignition temperature in the cutting area, upon which a stream of pure oxygen is then impinged.

The oxygen rapidly oxidizes the metal in a narrow kerf, as the molten oxide and metal are removed by the kinetic energy of the oxygen jet.

Although the oxyacetylene flame has a temperature of the order of 5,680° F., its relatively low radiation results in inefficient heat transfer from flame to workpiece material. As a result, while an oxyacetylene cutting flame works well for most steels, it is generally ineffective for the cutting of aluminum, cast iron, or rock. Thus, aluminum, and other metals having high thermal conductivity such as copper, dissipate the heat so rapidly that the cutting zone is not hot enough for oxygen ignition. Cast iron, and high-alloy stainless steels form high melting refractory materials on exposure to the oxyacetylene flame. In particular, alloy oxides form, which prevent iron oxidation. While the oxyacetylene flames are of high temperature, they have low luminosity and cannot radiate sufficiently to sustain the required temperature.

A technique that has met with success has been to increase luminosity by metal-enriching the preheat flame. Two such metal-enriched cutting processes have been developed, namely wire feed and powder cutting. These processes have achieved success under shop conditions, but are not completely satisfactorily adaptable to incorporation in portable equipment.

Current methods of powder and wire feed cutting require additional equipment over and above the cutting torch and its cutting tip. This additional equipment is frequently bulky. By way of example, in powder feeding, the additional equipment requires the use of compressed gas and a powder dispenser, while with wire feeding, a mechanical wire-feeder must be used. Both powder and wire feed cutting methods require a relatively high degree of operator skill, in view of the encumbrance of the cutting torches and the difficulty in manipulating the same.

This invention has as an object the provision of a novel cutting torch.

This invention has as another object the provision of a cutting torch capable of flame cutting materials which cannot be readily cut by conventional oxyacetylene torches, such as aluminum, cast iron, and rock.

This invention has as still another object the provision of a cutting torch which is portable, and which may be readily used in the field without bulky supporting equipment.

A still further object of the present invention is the provision of a method for achieving high temperature cutting.

Another object of the present invention is the provision of a method for the high temperature cutting of materials which cannot be cut by oxyacetylene flames, such as aluminum, cast iron, and rock.

A still further object of the present invention is the provision of a method which enables high speed cutting of a wide variety of materials to be achieved by relatively non-skilled operators.

A still further object of the present invention is the provision of a method for achieving high temperature cutting in which a greater degree of heat output per unit volume, and per unit weight can be achieved than by oxyacethylene cutting methods.

Other objects will appear hereinafter.

The foregoing objects are accomplished by the cutting torch of the present invention which utilizes a cutting flame of oxygen surrounded by a flame derived from a carrier liquefied gas, which has been gel-stabilized and enriched with a powdered metallic fuel.

In its broadest aspects, the present invention contemplates in a cutting torch the use of a high temperature flame derived from a carrier liquefied gas which has been gel-stabilized and enriched with a powdered metallic fuel.

For the purpose of illustrating the invention there is shown in the drawings forms which are presently preferred; it being understood, however, that this invention is not limited to the precise arrangements and instrumentalities shown.

Referring to the drawings, wherein like reference parts refer to like elements:

FIGURE 1 is a vertical sectional view of a cutting torch embodiment of the present invention.

FIGURE 2 is a cross-section taken on line 2—2 of FIGURE 1.

FIGURE 3 is a cross-section taken on line 3—3 of FIGURE 1.

FIGURE 4 is a cross-section taken on line 4—4 of FIGURE 1.

FIGURE 5 is a fragmentary view showing the cutting action of the cutting torch of the present invention.

FIGURES 6 through 8 are fragmentary views of different embodiments of the cylinder for the carrier liquefied gas.

FIGURE 9 is a fragmentary view of another embodiment of the present invention.

Referring to the drawings, and initially to FIGURE 1, the cutting torch of the present invention is designated generally as 10. The cutting torch 10 comprises an oxygen cylinder 12, and the cylinder 14 for the carrier liquefied gas which has been gel-stabilized and enriched with a powdered metallic fuel. For the purposes of abbreviation, in this specification such carrier liquefied gas, which has been gel-stabilized and enriched with a powdered metallic fuel will be referred to hereinafter as the thixogel fuel.

The oxygen cylinder 12 is provided with its tank valve 16. The thixogel fuel cylinder 14 is provided with its tank valve 18. A throttle valve 20 is provided in the oxygen line 22 intermediate the mixing chamber 24 and the tank valve 16. A throttle valve 26 is provided in the thixogel fuel line 28 intermediate the mixing chamber 24 and the tank valve 18.

The pure oxygen line 30 discharges through the central orifice 32 in the nozzle portion 34 of the cutting torch 10.

The mixture of oxygen and thixogel fuel, after being blended in the mixing chamber 24, wherein the liquefied gas is substantially vaporized with the powdered metallic fuel suspended therein, is discharged through the manifolded mixed gas lines 36.

The cutting torch 10 of the present invention effects cutting of the work 40 by the preheating flame from the preheating flame orifices 38 heating the work 40 to a temperature at which the oxygen from central orifice 32 can achieve burning of the work.

Unlike oxyacetylene flames, the flame derived from the thixogel fuels used in the present invention are highly radiative.

A suitable thixogel fuel, which can be used in the present invention, comprise the gelled liquefied gas fuels disclosed in United States patent application Ser. No. 598,200 filed Dec. 1, 1966, in the names of James Richard Edward Pheasant, William B. Tarpley, Jr., and Charles Dana McKinney, Jr., entitled Incendiary Compositions, the disclosure of which is incorporated herein by reference.

Suitable carrier gases for the purposes of the present invention include liquefied propane, liquefied butane, liquefied mixtures of propane and methane, liquefied mixtures of propane and ethane, liquefied mixtures of butane and methane. Indeed, mixtures comprising a component, which is normally liquid, may be used if blended with a relatively volatile gas, such as a mixture of pentane and methane. Indeed, using a pressurizing gas such as methane, higher boiling hydrocarbons up to hydrocarbons containing 10 to 12 carbon atoms could be used. However, these last-mentioned mixtures are not particularly desirable if vaporization in the torch is desired.

Generally, the thixogel fuels of the present invention contain from 30 to 75 volume percent solid fuels having a heat of combustion of greater than 5.0 Kcal./ml., and preferably greater than 9.0 Kcal./ml., uniformly disposed in a gelled normally liquid fuel, or a gelled meltable solid fuel, or a gelled liquefied gas fuel and insoluble therein.

The finely divided solid fuels should be powders having a particle size range of the order of up to about 50 microns maximum dimension. As a practical matter, the minimum size particles which can be used in the solid fuels of the present invention may be well below one micron maximum dimension. The limiting factor in minimum particle size will be ease of handling.

The preferred solid fuel consists of finely divided metal powders whose heat of combustion exceeds 9.0 Kcal./ml., such as fine boron, aluminum, zirconium, and magnesium. Lithium may also be incorporated as a finely divided solid for enhanced combustion. Moreover, finely divided solid fuels consisting of compounds such as metal hydrides may be used.

The thixogel fuels of the present invention include a gelling agent, which should be present in an amount sufficient to effect gelling of all of the liquid present in the composition. The gelling agent should be one which has a gelling efficiency such that no more than about 5 weight percent of the composition need be gelling agent. In some compositions, the finely divided powder possesses gelling characteristics, and the amount of gelling agent which need be present in such compositions may be reduced. Generally, at least about one-half weight percent of gelling agent must be present to achieve satisfactory gelling of the liquid portion of the composition. A satisfactory gelling agent is the pyrogenic silica designated "Cab-O-Sil H5" and sold by Godfrey L. Cabot, Inc. of Boston, Mass.

Examples of gelling agents include: pyrogenic silica, namely finely divided silica particles derived from the combustion of silicon tetrachloride, such materials being commercially available as gelling agents under the trademark "Cab-O-Sil"; carbon black having a clean microsurface and a high degree of structure with said structure being internal with particles smaller than 25 millimicrons as measured by an electron microscope and presenting a ratio of BET surface as determined by nitrogen adsorption measurement to electron microscope surface of between 2½ and 6 and with larger particles being external, namely possessing persistent reticulate chain formation observable in the electron microscope after mulling by the procedure by Ladd [1]; pyrogenic aluminum oxide derived from the combustion of aluminum trichloride; carboxymethyl cellulose, sulphonated polyvinyl toluene; carogeenin, and guar, etc. A suitable pyrogenic alumina is available under the trade name "Alon C."

By "gelled liquid" as used herein is meant a material possessing a yield stress sufficiently high to prevent flow under low forces such as gravitation, namely a yield stress of 200 dynes per square centimeter, is adequate.

In some situations the addition of a surfactant, as in the concentration of 0.1 to 1 weight percent based on the amount of gelled liquid present is helpful. Examples of suitable surfactants include: sorbitan trioleate; polyethylene glycol ether of hydroabietyl alcohol; polyoxyethylene sorbitan monooleate; diethylene glycol laurate; sulfonated castor oil, triethanolamine monooleate.

The presence of the surfactant improves wetting of the finely divided powders and increases flowability.

The function of the gelled liquid is to keep the particles making up the finely divided powder from each other so that they do not adhere to each other, as by sintering or by Van der Waals attraction.

A mixture of aluminum powder of the aforesaid size range and liquefied propane, such as propane under a pressure of the order of 140–160 p.s.i. constitutes a preferred thixogel fuel.

A comparison of the thermal energy analysis of an acetylene system with a 40 v/o aluminized thixogel is set forth in table below.

TABLE

|  | Acetylene | 40 v/o aluminized thixogel |
|---|---|---|
| Volume (ft.³) | 2 | 2 |
| Pressure at 70° F. (p.s.i.) | 250 | 125 |
| Flame temperature, ° F | 5,680 | 5,800 |
| Heat of combustion: |  |  |
| B.t.u./ft.³ of gas | 1,484 |  |
| B.t.u./ft.³ of liquid+Al powder |  | 1.30×10⁶ |
| Usable volume in tank at ambient pressure, ft.³ (gas) | 300 |  |
| Usable B.t.u./tank | 4.45×10⁵ | 2.18×10⁶ |
| Weight of commercial tank (lb.) | 223 | 104 |
| B.t.u./pound of system weight | 1.82×10³ | 8.77×10³ |
| Improvement thixogel/acetylene: |  |  |
| B.t.u. on volume bases |  | 4.9 |
| B.t.u./lb. of system and fuel weight |  | 4.8 |

The improvement gained by the use of the thixogel as opposed to acetylene on a B.t.u.-per unit-volume basis of 4.9 to 1 and on a B.t.u. per pound of system and fuel weight of 4.8 to 1 is to be noted. Moreover, unlike an acetylene based flame, the thixogel fuel flames of the present invention are highly radiative. As a result, the cutting torch 10 of the present invention can be used for the convenient cutting of highly conductive metals such as aluminum and copper.

The cutting torch 10 of the present invention can be used for the cutting of cast iron and other ferrous metals of high alloy content, since the intense heat liberated by the powdered metallic fuel achieves a combination melting and fluxing action.

It is to be noted that unlike conventional powder cutting processes, the process involving cutting torch 10 does not use an inert gaseous diluent. The liquefied carrier gas may be mixed with the desired amount of oxygen, depending upon the particular requirements, by varying the relative ---
[1] Rubber Age, volume 57, June 1945, page 299.

sizes of the openings in throttle valves 20 and 26. Indeed, in some cases, it may prove advisable to admit no oxygen through throttle valve 20 and effect all of the pre-heating with the carrier gas from the thixogel fuel cylinder 14, which may be vaporized in the mixing chamber 24.

In order to minimize erosion of the throttle valve 26, this valve may be of the construction set forth in FIGURE 3 in which the valve is of the iris diaphragm type. Valve 26 includes the rotatable collar 41 having extensions 42 which cam the wedges 43 against thixogel fuel line 28. The wedges 43 are received in slots in guide 44 which encircles the thixogel fuel line 28. This portion of the thixogel fuel line 28 is formed of resilient elastomeric tubing. Rotation of the collar 41 counterclockwise in FIGURE 3 results in the wedges 43 closing the bore of thixogel fuel line 28. Rotation of the collar 41 in the opposite direction opens the bore of thixogel fuel line 28 as the elastomeric tubing urges the wedges 43 radially outwardly.

Because the thixogel fuels used in the present invention are high-energy fluid slurries, the cutting torch 10 of the present invention can use a lighter weight thixogel fuel cylinder 14 than would be used with comparable size oxyacetylene cutting torches. In one example, the tank pressure in the thixogel fuel cylinder 14 is of the order of 150 p.s.i., whereas a comparable oxyacetylene cutting torch would use a tank pressure of 250 p.s.i. for the acetylene.

The elimination of auxiliary equipment, such as powder feeding equipment, and the use of relatively lightweight silica enables the cutting torch 10 of the present invention to be portable.

The cutting torch 10 of the present invention can be used for achieving cutting under water at depths far below those in which an oxyacetylene torch can be safely used. Thus, the explosion hazard occasioned by the use of oxyacetylene torches at depths greater than on the order of about 20 feet is not present with the cutting torches of the present invention.

In some embodiments a throttle valve 46 may be provided in the pure oxygen line 30. In these embodiments, all of the oxygen and all of the thixogel fuel may be added through respective throttle valves 20 and 26 to line 36 and dispensed through the orifices 38. This embodiment has prime utility for the cutting of materials such as concrete or stone, and like non-combustible materials, where the sole cutting action is due to heat.

Since there is a tendency for the thixogel fuels used in the present invention to core, such as shown in FIGURE 6, it is preferable for the thixogel fuel cylinder to have an inverted conical shape at its lowermost end, such as at 48 in FIGURE 6. This facilitates optimum transfer of the finely divided powdered metallic fuel.

An alternative thixogel fuel cylinder construction is shown in FIGURE 7, in which the thixogel fuel cylinder is provided with a bifurcated diptube 50. The bottom of the thixogel fuel cylinder 14 is convex at 52 in reference to the diptube 50, so as to provide for optimum powdered metallic fuel transfer. In the embodiment shown in FIGURE 7 the pressure generated by the vaporized gas at the top of the thixogel fuel cylinder 14 forces the thixogel through the diptube 50.

FIGURE 8 shows an alternative construction in which the diptube 54 is received in a sump 56 in the floor of the thixogel fuel cylinder 14.

In both the embodiments of FIGURES 7 and 8 the escape velocity of the particles of powdered metallic fuel is kept high by the design of the thixogel fuel cylinder 14. However, it is to be understood that the process of the present invention contemplates adding the thixogel fuel to the oxygen in oxygen line 22 by expansion in the mixing chamber 24, and also by aspiration by the oxygen from oxygen line 22 flowing in advance of the thixogel fuel at a high velocity. The degree of blending and the escape velocity of the powdered metallic fuel particles can be regulated by varying the openings in the throttle valves 20 and 26.

Other means for energizing the thixogel fuel may be used. These include the use of an ultrasonic vibrator of the thixogel fuel cylinder 14; the use of heating means embracing the cutting torch 10 to add energy to the mixed gas lines 36; etc.

Moreover, as indicated above, relatively volatile hydrocarbons such as methane and ethane may be present in the thixogel fuel cylinder. These volatile hydrocarbons act as a gas piston and urge the thixogel fuel from the thixogel fuel cylinder 14, with the resultant increase in the escape velocity of the metal particles from the thixogel fuel.

In the embodiment shown in FIGURE 9, the thixogel fuel cylinder 14a is inverted in reference to the cutting torch. Thus, its sealed end is uppermost. In this embodiment the volatilized gas from the thixogel fuel collects at the top of the cylinder and urges the liquefied gas, which has been gel-stabilized and enriched with the powdered metallic fuel, downward through the tank valve 18a. The embodiment shown in FIGURE 9 has prime utility where the thixogel fuel is not mixed with the oxygen in the mixing chamber 24, but is brought out as a liquid to the orifices 38. The thixogel fuel in this embodiment may be ignited outside the cutting torch 10. It will then expand rapidly and burn at a small finite distance away from the tip from which it was discharged. It will act as a cone or envelope around the oxygen.

The advantage of the embodiment shown in FIGURE 9 is that the liquefied thixogel fuel serves as a lubricant for the powdered metallic fuel particles, and minimizes erosion.

The following compositions are illustrative of gelled carrier liquefied combustible gas compositions which can be used in the cutting torch and process of the present invention:

EXAMPLE 1

A uniform mixture of 40 volume percent aluminum powder, 59 volume percent liquid butane, and 1 volume percent pyrogenic silica.

EXAMPLE 2

A uniform mixture of 49 volume percent magnesium powder, 50 volume percent liquefied propane, and 1 volume percent carbon black.

EXAMPLE 3

A uniform mixture of 70 volume percent boron, 28 volume percent of a liquefied mixture of methane and hydrocarbons having from 10 to 12 carbon atoms, and 2 volume percent of pyrogenic alumina.

EXAMPLE 4

A uniform mixture of 30 volume percent of finely divided zirconium, 68 volume percent of a liquefied mixture of butane and methane, and 2 volume percent of carboxymethyl cellulose.

EXAMPLE 5

A uniform mixture of 50 volume percent of finely divided aluminum, 47 volume percent of a liquefied mixture of pentane and methane, and 3 volume percent of guar.

In the following claims, the term "liquefied combustible gas" shall be construed as meaning both a liquefied normally gaseous material, and a liquid mixture of a normally liquid material, such as hydrocarbons containing 10 to 12 carbon atoms and a normally gaseous material, such as methane.

The present invention may be embodied in other specific forms without departing from the spirit or essential attributes thereof and, accordingly, reference should be made to the appended claims, rather than to the foregoing specification as indicating the scope of the invention.

It is claimed:
1. In a cutting torch having a nozzle the improvement comprising a cylinder of gelled carrier liquefied combustible gas which contains uniformly disposed therewithin from 30 to 75 volume percent of a finely divided solid fuel, said finely divided solid fuel having a heat of combustion of greater than 5.0 Kcal./ml., and a conduit from said cylinder communicating with an orifice in the nozzle.

2. A cutting torch in acordance with claim 1 in which the heat of combustion of the finely divided solid fuel is greater than 9.0 Kcal./ml.

3. A cutting torch in accordance with claim 1 which includes a gas-containing separate cylinder, and a separate conduit communicating between an orifice in the nozzle and said separate cylinder.

4. A cutting torch in accordance with claim 1 in which the bottom of the cylinder is substantially conical.

5. A cutting torch in accordance with claim 1 in which the conduit extends almost to the bottom of the cylinder, and is bifurcated near such bottom, with such bottom presenting a convex surface intermediate the bifurcated portion of said conduit.

6. A cutting torch in accordance with claim 1 in which the conduit extends almost to the bottom of the cylinder, and the bottom of the cylinder is provided with a sump portion within which the lowermost end of the conduit is disposed.

7. A cutting torch comprising a nozzle having a central orifice, and a plurality of other orifices disposed about said central orifice, an oxygen-containing cylinder, a first conduit communicating said oxygen-containing cylinder with said central nozzle orifice, a cylinder of gelled carrier liquefied combustible gas which contains uniformly disposed therewithin from 30 to 75 volume percent of finely divided solid fuel, said finely divided solid fuel having a heat of combustion of greater than 5.0 Kcal./ml., a second conduit communicating said last-mentioned cylinder with said other orifices, and a valved conduit joining said first and second conduits to enable oxygen from said oxygen-containing cylinder to be added to said second conduit.

8. A cutting torch in accordance with claim 7 in which the conduits are disposed within a cutting torch body, and the two cylinders are disposed on opposite sides of said cutting torch body.

9. A cutting torch in accordance with claim 7 which includes valve means intermediate the cylinder of gelled carrier liquefied gas and the second conduit.

10. A cutting torch in accordance with claim 9 which includes valve means in said first conduit.

11. A process for high temperature cutting comprising gasifying a gelled carrier liquefied combustible gas which contains uniformly disposed therewithin from 30 to 75 volume percent of a finely divided solid fuel, said finely divided solid fuel having a heat of combustion of greater than 5.0 Kcal./ml., to form a stream, igniting said gas and solid fuel stream, and applying said ignited stream to the work being cut.

12. A process in accordance with claim 11 in which the finely divided solid fuel has a heat of combustion of greater than 9.0 Kcal./ml.

13. A process for high temperature cutting comprising forming a stream of oxygen, separately forming an adjacent stream by gasifying a gelled carrier liquefied combustible gas which contains uniformly disposed therewithin from 30 to 75 volume percent of a finely divided solid fuel, said finely divided solid fuel having a heat of combustion of greater than 5.0 Kcal./ml., igniting both of said streams, and applying said ignited streams to the work being cut.

14. A process in accordance with claim 13 in which the adjacent stream embraces the oxygen stream.

15. A process in accordance with claim 13 in which a portion of the oxygen stream is combined with the adjacent stream prior to ignition of the two streams.

References Cited
UNITED STATES PATENTS

| | | | |
|---|---|---|---|
| 3,034,874 | 5/1962 | Emmons et al. | |
| 2,711,979 | 6/1955 | LaPota | 110—22 XR |
| 3,095,334 | 6/1963 | Scurlock | 44—7 XR |
| 3,105,747 | 10/1963 | Calhoun et al. | 44—7 XR |

KENNETH W. SPRAGUE, *Primary Examiner.*

U.S. Cl. X.R.

110—22; 431—91